(Model.)

C. L. GENOWAYS.
Tire Tightener.

No. 235,610.          Patented Dec. 14, 1880.

Witnesses:
C. L. Fulkerson
J. J. Atchison

Inventor:
Clinton L. Genoways

N. PETERS, PHOTO-LITHOGRAPHER, WASHINGTON, D. C.

UNITED STATES PATENT OFFICE.

CLINTON L. GENOWAYS, OF SCHELL CITY, MISSOURI.

TIRE-TIGHTENER.

SPECIFICATION forming part of Letters Patent No. 235,610, dated December 14, 1880.

Application filed September 9, 1880. (Model.)

*To all whom it may concern:*

Be it known that I, CLINTON L. GENOWAYS, of Schell City, in the county of Vernon and State of Missouri, have invented a new and useful Improvement in a Tire Tightener or Fastener for Carriages and Wagons, which may also be used as a jack for lifting heavy weights, of which the following is a specification.

This invention is intended to be used on the wheels of vehicles while on the road or while loaded without removing the load or taking off the wheels.

Figure 1 is a side view of the whole machine. A is the swivel. B' is the bevel-flange on the outer ends of right and left hand screws B B, which fit on the small ends of the spokes just beneath the rim.

Fig. 2 is an edge view of the whole machine. A is the swivel. B' is the bevel-flange on the outer ends of screws, to fit on the spokes next to felly.

Fig. 3 is an end view of the whole machine. A is the swivel. B' is the bevel-flange on the outer ends of the right and left screws.

Figure 2:
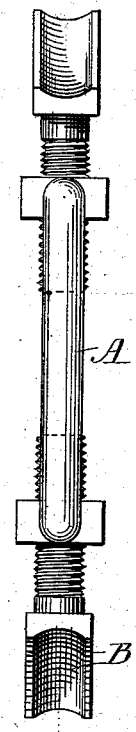
Figure 3:
Figure 1:
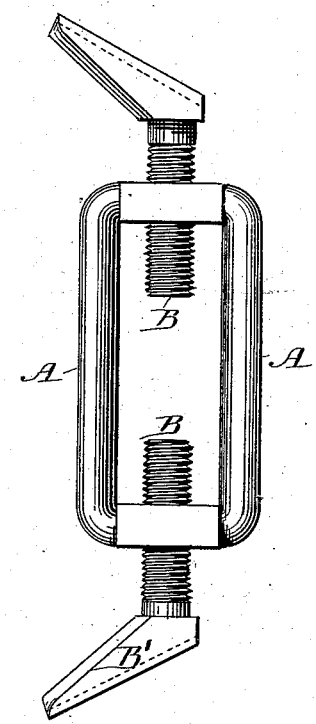
Figure 4:
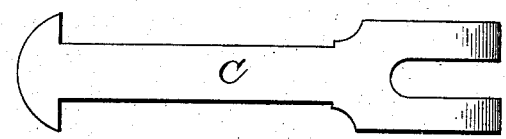
Fig. 4 is the key to drive in between the ends of the fellies, the slot in the end of the key to straddle the dowel-pin in the fellies to force them apart to admit a piece of leather or other substance.
Figure 5:
Fig. 5 is an edge view of the key.

In operation the bevel-flanges are placed against two adjoining spokes, and the swivel is then turned so as to force the spokes apart, thus opening the joint between two sections of the felly. A blocking of wood, leather, or other suitable material is then forced into the opening, which causes the rim to completely fill the tire.

What I claim is—

The tire-tightening device consisting of the swivel A and two right and left screws, B, having bevel-flanges B', all substantially as described.

CLINTON L. GENOWAYS.

Witnesses:
D. H. JENNINGS,
T. C. HAMBAUGH.